United States Patent [19]
Fukaya et al.

[11] Patent Number: 5,764,009
[45] Date of Patent: Jun. 9, 1998

[54] MOTOR CONTROL DEVICE IN ELECTRIC MOTOR-OPERATED VEHICLE

[75] Inventors: Mitsuo Fukaya; Hiroaki Takechi; Koshi Sasaki, all of Iwata, Japan

[73] Assignee: Yamaha Hatsudoki Kabushiki Kaisha, Iwata, Japan

[21] Appl. No.: 518,679

[22] Filed: Aug. 24, 1995

[30] Foreign Application Priority Data

Aug. 25, 1994 [JP] Japan .................. 6-201174

[51] Int. Cl.$^6$ ........................................ H02P 1/00
[52] U.S. Cl. .................... 318/300; 318/376; 388/801; 388/806; 388/826; 388/833
[58] Field of Search .................. 318/375, 376, 318/379–381, 254, 439, 138, 280, 300; 388/803–806, 809, 811, 815, 816, 820, 826–831, 801, 802

[56] References Cited

U.S. PATENT DOCUMENTS

| | | | |
|---|---|---|---|
| 4,267,492 | 5/1981 | Manners | 318/379 X |
| 4,547,678 | 10/1985 | Metzner et al. | 290/40 C |
| 4,639,647 | 1/1987 | Posma | 318/497 X |
| 4,733,146 | 3/1988 | Hamby | 318/376 X |
| 4,859,916 | 8/1989 | McCambridge | 318/293 |
| 5,311,108 | 5/1994 | Willard | 318/381 |
| 5,331,258 | 7/1994 | Lankin et al. | 318/139 |
| 5,332,954 | 7/1994 | Lankin | 318/527 X |
| 5,598,072 | 1/1997 | Lambert | 318/519 X |

*Primary Examiner*—Brian Sircus
*Attorney, Agent, or Firm*—Knobbe, Martens Olson & Bear LLP

[57] ABSTRACT

An electric motor control for a series-wound DC motor for providing speed control and also for controlling regenerative braking. The regenerative braking is energized either when the accelerator pedal is released and/or when a brake pedal is depressed. In addition, the control circuit limits the total vehicle speed and brakes the vehicle if it is stopped and begins to roll due to gravity.

22 Claims, 6 Drawing Sheets

Current Flow In the Case of (1)

Current Flow In the Case of (2)

Current Flow In the Case of (3)

Current Flow In the Case of (4)

MOTOR CONTROL DEVICE IN ELECTRIC MOTOR-OPERATED VEHICLE

BACKGROUND OF THE INVENTION

This invention relates to a motor control and more particularly to an improved motor control for an electric motor-operated vehicle.

In many vehicle applications, an electric motor is employed as the prime mover. Examples of vehicles having such power are wheel chairs, bicycles, golf carts, and various other types of vehicles. Conventionally, these vehicles are powered by DC shunt-wound motors having a control circuit as best seen in FIGS. 1 and 2.

As may be seen in these figures, an electric motor has its armature winding $M_a$ wired across a first DC power source, indicated as Battery $_1$ through a pair of switches, Switch $_1$ and Switch $_2$. In a similar manner, the exciter winding $M_e$ of the electric motor is connected to a second DC power source Battery $_2$ via a reversing switch, Switch $_3$. Hence, when Switches 1 and 2 are turned on and Switch $_3$ is switched so that the exciter is energized in the same sense as the armature, the motor will provide electrical power and drive the associated vehicle.

In order to provide regenerative braking for the vehicle, a pair of diodes $D_1$ and $D_2$ are wired across the armature $M_a$ and between one terminal of the battery, Battery $_1$ and one terminal of the armature $M_a$ so that if the motor is driven it can act as a generator to charge Battery $_1$. This is accomplished by operating switch $S_3$ so as to reverse the energization of the exciter winding $M_e$ and then when the motor is driven by the forward motion of the vehicle, it will act as a generator to charge Battery $_1$ and provide regenerative braking for the vehicle.

This type of system is relatively simple and effective. However, such shunt-wound motors generally have low starting torque. This is particularly disadvantageous since many vehicle operations, particularly electric motor-operated golf carts, require good performance at high loads, particularly when starting up on an incline.

Thus, there may be a preference to employ a DC series wound motor for such applications because they provide large starting torque. However, if a series-wound motor is utilized as the primer mover, the provision of regenerative braking presents substantial problems. This results in the provision of a complicated control structure and thus the cost and size of the mechanism becomes quite large.

It has been proposed to avoid a complicated control circuit and still obtain regenerative braking by employing a drive-brake switching lever. However, this use of switching such a switching lever makes the operation rather cumbersome and requires learning by the operator.

Thus, it is much better to provide regenerative braking which operates automatically when the operator's foot is released from the accelerator pedal. However, for the reasons aforenoted, the use of such a system with DC series wound motors has not been available.

It might be possible to provide regenerative braking with a simple motor-control circuit and a DC shunt-wound motor if appropriate shunt-wound motors were available. However, such motors are not presently available and the potential volume for vehicle applications is not great enough to induce motor manufacturers to produce such a motor.

It is, therefore, a principal object of this invention to provide an improved motor control device employing a series-wound motor and wherein the generative braking can be easily obtained.

It is a further object of this invention to provide an improved motor-control circuit for a series-wound motor wherein regenerative braking can be obtained without complicated controls and merely by the operator releasing the accelerator pedal.

It is a further object of this invention to provide an improved electric motor control for a vehicle that provides large starting force and simple and inexpensive construction.

SUMMARY OF THE INVENTION

This invention is adapted to be embodied in an electric motor control for an electric motor-driven vehicle. The motor comprises an armature. A DC power supply is provided. A first parallel circuit extends across the battery and comprises a first switch and a first diode. A second parallel circuit is positioned across the battery and in series relationship with the first parallel circuit. The second parallel circuit is comprised of a second switch and a second diode which permits current flow in the same direction as that of the first diode. A motor-control circuit is connected to one side of the armature at the junction between the parallel circuits. The other side of the armature is connected to one pole of the DC power source. Means are provided for selectively operating one of the switches to energize the armature in a direction to operate the motor and power the vehicle or for energizing the other of the switches so that the motor functions as a generator for charging the battery to provide regenerative braking of the vehicle.

DETAILED DESCRIPTION OF THE PREFERRED EMBODIMENTS OF THE INVENTION

Figure 3:
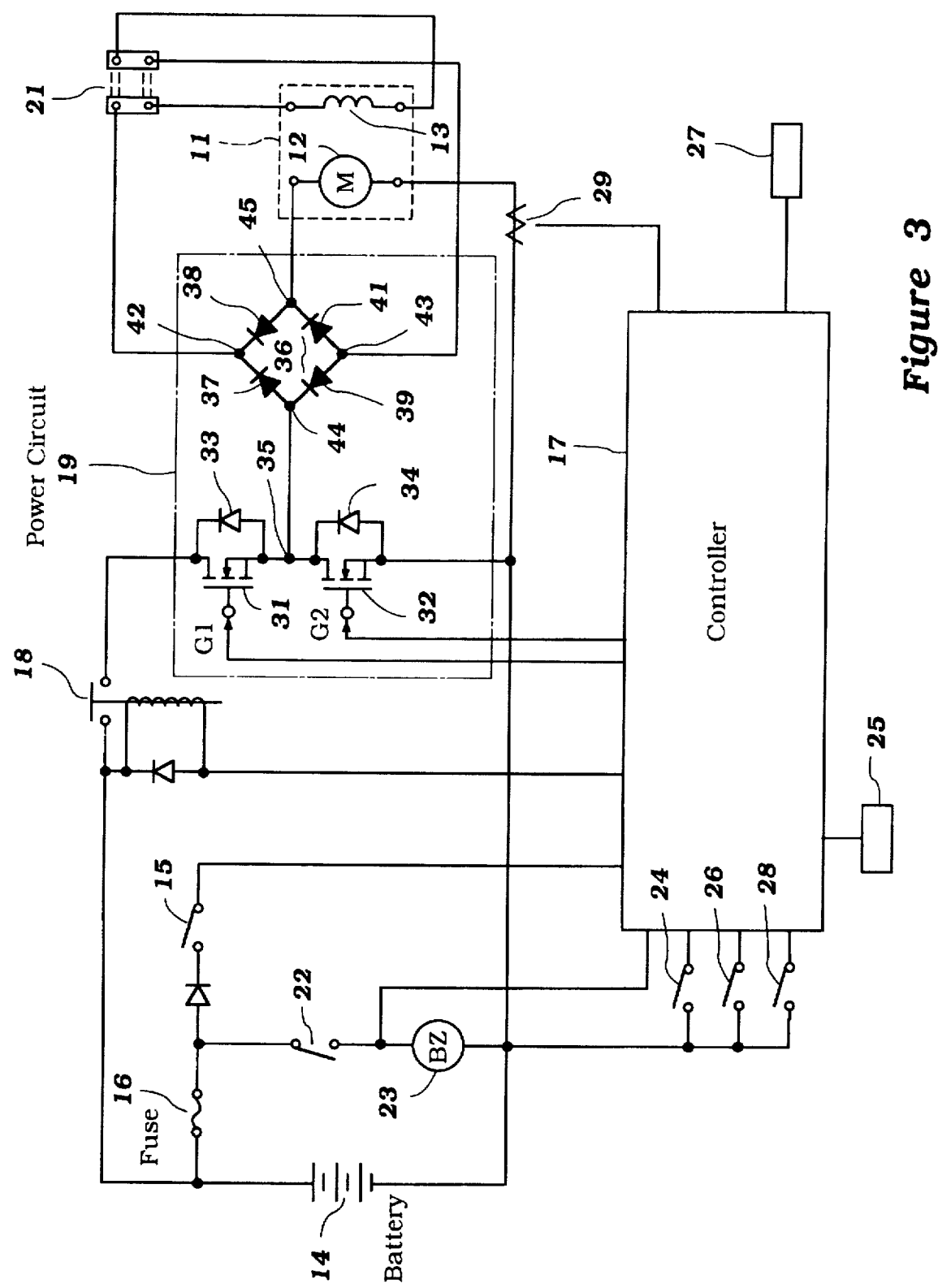
FIG. 3 is a schematic electrical diagram showing the construction and operation of the preferred embodiment of the invention.

Referring now in detail to the drawings and initially to FIG. 3, a series-wound electric motor is shown partially schematically and is indicated generally by the reference numeral 11. The electric motor 11 has an armature winding 12 and an exciter winding 13.

The armature of the motor 11 is connected through a suitable transmission to the propulsion system for the associated vehicle. In a land vehicle operation this propulsion system will comprise one or more wheels. As has been previously noted, the preferred environment for the invention, although the applicability is not so limited, is for powering a golf cart. The rear wheels of the golf cart may be driven from the armature or output shaft of the motor 11 through a suitable transmission which may include a differential.

Electrical power is delivered to the motor 11 from a battery, indicated by the reference numeral 14. The battery 14 provides the electrical power to the motor 11, in a manner which will be described, when a main switch, indicated at 15, is switched on. A fuse 16 is interposed between the terminal of the battery 14 and the main switch 15 for electrical protection.

When the main switch 15 is turned on, it energizes a controller, indicated schematically at 17 and having an internal construction which will be described later by particular reference to FIG. 4 where it is shown in more detail. The controller 17 operates a relay switch 18 so as to energize a power circuit 19 which supplies controlled electrical power to the motor 11 for its operation, in a manner which will be described.

The circuit connecting the power circuit 19 to the motor 11 includes a transmission control switch 21 which selectively energizes the motor 11 and specifically its exciter winding 13 for forward or reverse rotation. In addition, a reverse switch 22 is actuated when operating in reverse and this also energizes a warning buzzer 23 to warn people in the vicinity that the vehicle is being driven in a rearward direction.

In addition to the power supplied by the battery 14 when the main switch 15 is turned on, the controller 17 receives certain input signals and control information. These include a signal from an accelerator pedal switch 24 which is closed at any time when the accelerator pedal (not shown) of the associated vehicle is depressed. The accelerator pedal also operates a potentiometer 25 which provides a signal to the controller 17 indicative of the degree of depression or the position of the accelerator pedal and, accordingly, the amount of electric power called for by the operator.

Also, the vehicle is provided with a brake pedal (not shown) and a brake pedal switch 26 is operated when the brake pedal is activated by the operator. Rather than a brake pedal, other types of brake actuators such as levers or the like may be employed.

The system has, as will be described, a speed regulator so as to ensure that a predetermined vehicle speed is not exceeded and, therefore, a vehicle speed sensor 27 is also provided that outputs a signal to the controller 17.

As has been noted, the transmission switch 21 is operative to provide reverse drive of the motor 11 in a manner which will be described. When this switch is activated into the reverse mode, a reverse mode switch 27 as well as the switch 22 is energized and this switch 28 provides a signal to the controller 17 that the operator is calling for reverse operation.

In addition, there is provided a current sensor 29 which is in the connection between one of the armature terminals and the one post of the battery 14. This current signal is also provided to the controller 17.

The speed of the motor 11 is controlled by pulse width modulation (PWM) and to this end there are provided a pair of field effect transistors (FET) 31 and 32 which act in a series circuit across the battery 14. These FETs are never switched on simultaneously and as will be described one is used for acceleration speed control and the other regulates regenerative braking. Each FET 31 and 32 is part of a parallel circuit that includes a respective diode 33 and 34 with the diodes permit current flow from or to a junction 35 between the FETs 31 and 32. The FET 31 is used for forward drive and reverse regenerative braking. The FET 32 is used for forward braking and reverse drive. The FETs 31 and 32 receive respective pulse control signals G1 and G2 from the controller 17 so as to control the speed of the motor 11 and the braking in the respective directions.

The junction 35 is in circuit with one terminal of the motor armature 12 via a diode bridge 36. The diode bridge 36 includes four diodes 37, 38, 39, and 41. The cathodes of the diodes 37 and 38 are connected to each other at a junction 42. The anodes of the diodes 39 and 41 are connected to each other at a junction 43. The anode of the diode 39 and the cathode of the diode 37 are connected at a junction 44 which is in circuit with the junction 35 between the FETs 31 and 32.

The anode of the diode 38 and the cathode of the diode 41 are connected at a junction 45 which is, in turn, connected to the one terminal of the armature winding 12.

The junction 42 is connected to one terminal of the reversing or transmission switch 21 while the junction 43 is connected to the other terminal of the reversing switch 21. By operating the switch from the position shown in solid lines in FIG. 3 to the reverse position as shown in phantom lines, the polarity on the exciter winding 13 will be reversed.

The details of the controller will now be described by reference to FIG. 4. The controller 17 includes an ECU 46 which receives electrical power from the main switch 15 through a power supply circuit 47 which provides the controlled source of power at the appropriate value to not only the CPU 46 but also various other circuits in the controller 17. In order to reduce power consumption, the CPU 46 activates an automatic power shut-off circuit 48 which supplies a signal to the power supply circuit 47 to shut off the supply of power to certain circuits under the command of the CPU 46. A watch dog timer 49 monitors the operation of the CPU 46 and if there is a defect it will reset the CPU 46.

The accelerator detection switch 24, the brake switch 26, the limit switch 28, and the reverse switch 22 all input their signals to respective switch input circuits 51 which, in turn, output the signals to the CPU 46. The potentiometer 25 associated with the accelerator pedal inputs its signal to a potentiometer input circuit 52 which outputs a voltage signal indicative of the position of the accelerator pedal to an analog/digital converter which forms a portion of the CPU 46.

In a like manner, the output of the current sensor 29 is inputted to a current detector circuit 53 which also outputs a voltage signal indicative of current to the CPU through the analog/digital converter circuit. In a similar manner, the vehicle speed sensed by the vehicle speed sensor 27 is inputted to a vehicle speed sensor input circuit 54 which in turn outputs a voltage signal to the CPU 46 through its analog-to-digital converter.

As has been previously noted, the controller 17 and specifically the CPU 46 switches the main relay 18 on and off through a main relay drive circuit 55. When the system is switched on, the main relay drive circuit 55 energizes and switches on the main relay 18. The CPU 46 switches off the main relay 18 by deenergizing the main relay drive circuit 55 when the accelerator switch 24 is detected to be off (operator not pressing the accelerator pedal) and the vehicle speed indicated by the vehicle speed sensor 27 is zero, vehicle stopped.

The FET control signals G1 and G2 are outputted by a pulse width modulation circuit, indicated generally at 56. This circuit receives pulse signals P1 and P2 from the CPU 46 at a duty cycle, as will be described. This pulse width modulation circuit 56 includes a pair of filters 57 and 58 which receive pulse signals P1 and P2 outputted from the CPU 46. The output from the filter 58 goes to a polarity reversal circuit 59 to reverse the polarity of the pulse signal P2 which is the reverse drive signal.

The pulse signals P1 and P2 when filtered and reversed, in the case of the signal P2, are outputted to a proportional integration (PI) operational circuit 61.

A proportional integration operation to determine a value for acceleration is obtained by subtracting the output voltage of the current detector circuit 53 from the output voltage of the filter 57 or upon deceleration by substituting this value from the reversed output signal of the filter 58 from the circuit 59.

This output voltage is then transmitted to a comparator circuit 62 which, in turn, discriminates the level of a triangular wave output from an oscillator circuit 63 with the signal of the proportional integration PI circuit 61 to output a pulse width of duty ratio commensurate with the circuit 61 to an FET drive circuit 64. The appropriate forward or reverse or braking signals G1 or G2 are then output to the gates of the FETs 31 or 32 depending upon forward or reverse drive so as to supply electrical power to the armature winding 12 for operating the motor 11 in the appropriate direction and at the appropriate power.

The controller 17 also incorporates a number of protection circuits 65 which control the FET drive circuit 64 to prevent overloading of the power supply circuit 19.

Figure 5:
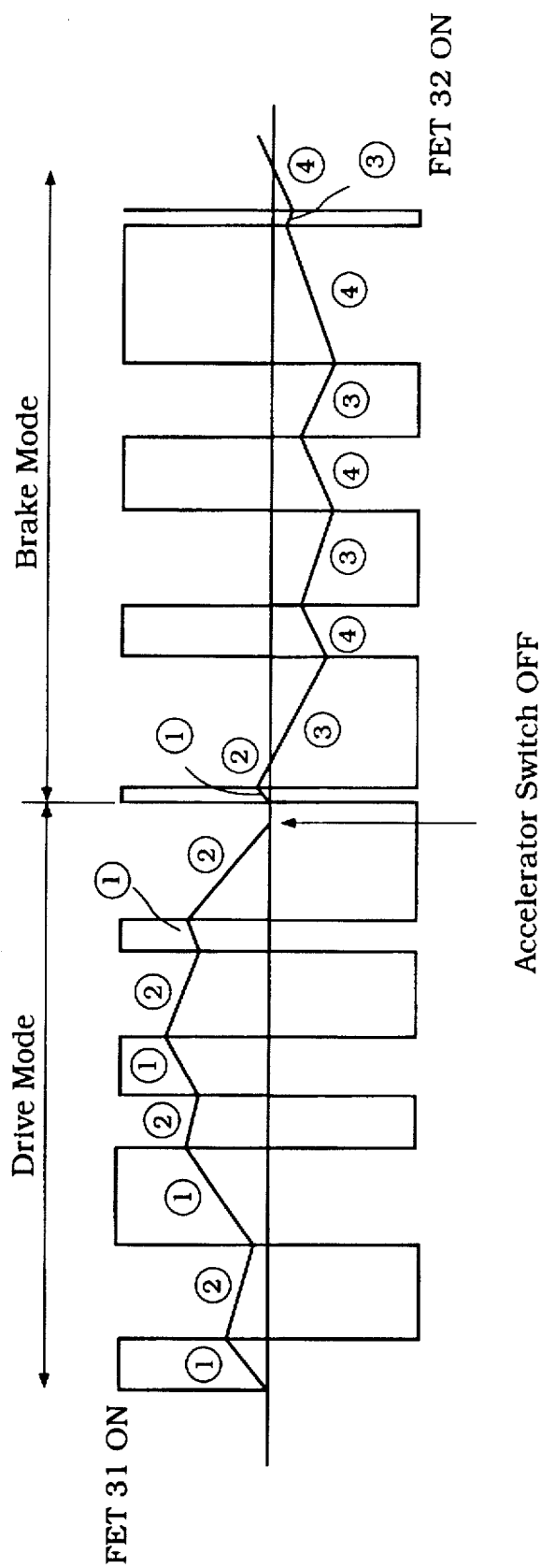
FIG. 5 is a graphical view showing the control routine when accelerating to a particular vehicle speed and then decelerating to stop.

The mode of operation may be best understood by reference to FIG. 5 which shows a normal cycle when the operator initially depresses the accelerator pedal to call for a certain speed, changes the power demand as conditions warrant and then releases that accelerator pedal to cause the vehicle to be brought gradually to a stop. The various control modes indicated by the numbers 1, 2, 3, and 4 in FIG. 5 represent the current flow states indicated in FIGS. 6, 7, 8, and 9, respectively. Thus, these figures should be considered when considering the operation which will be described by reference to FIG. 5. In FIGS. 6, 7, 8, and 9, certain components have not been illustrated because they need not be present in the figures to enable those skilled in the art to understand how the system operates.

Figure 1:
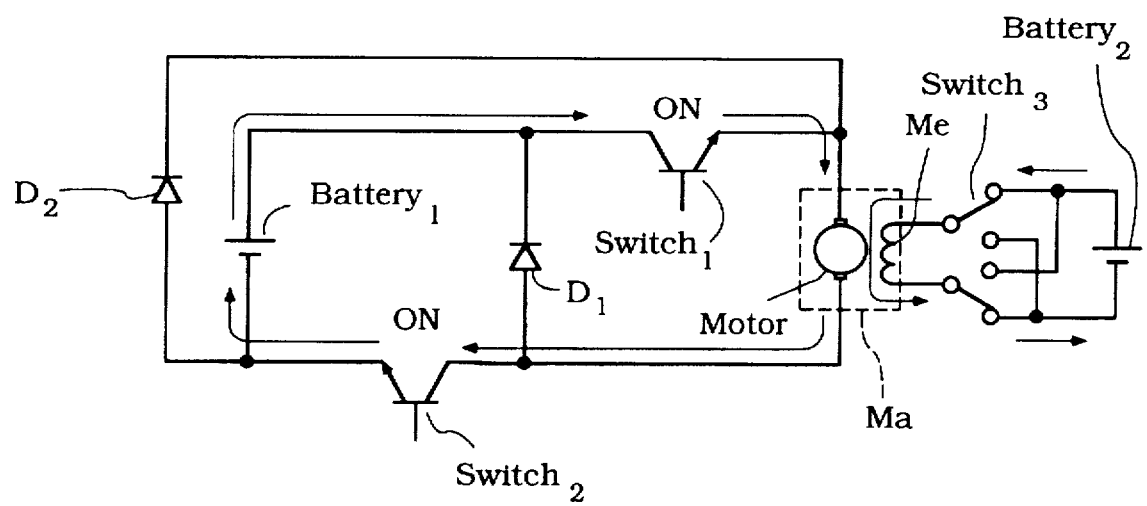
FIG. 1 is a schematic view of a prior art-type shunt-wound electric motor-operated vehicle in the driving mode.
Figure 2:
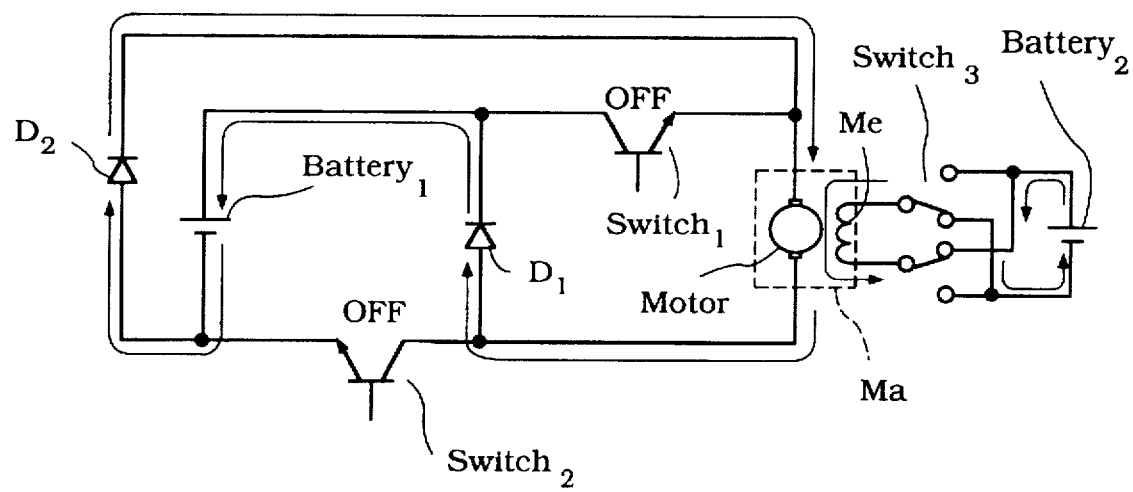
FIG. 2 is a schematic view of the prior art device shown in FIG. 1 and showing the system switched to provide regenerative braking for the vehicle.
Figure 6:
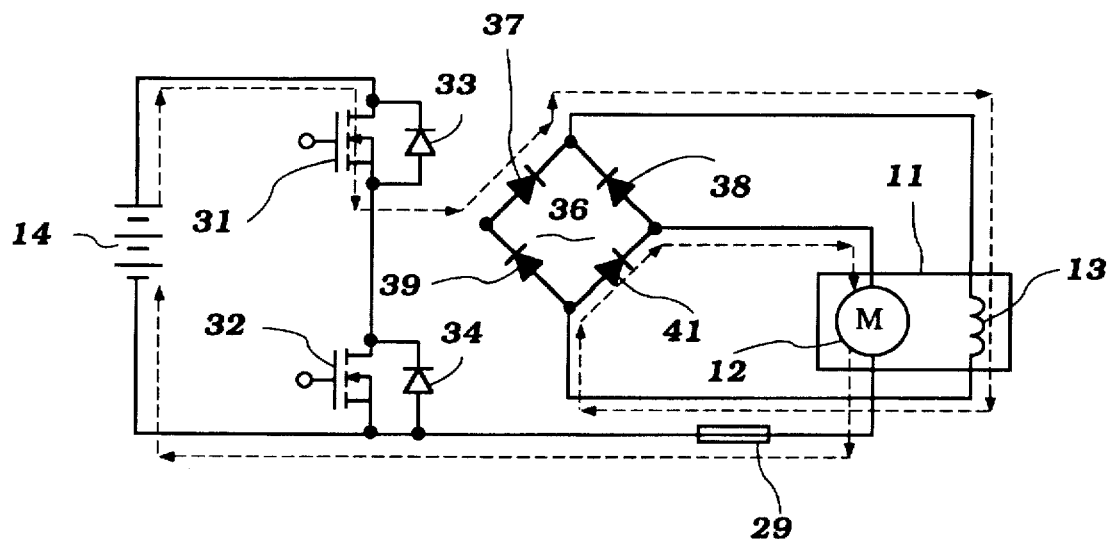
FIG. 6 is an electrical diagram showing the current flow under the operational control mode indicated at 1 in FIG. 5.

Beginning with a condition that the operator first depresses the accelerator pedal starting at the left-hand side of FIG. 1, the accelerator switch 24 will be switched on and the input is transmitted to the CPU 46 so as to energize the circuit. The actual amount of electric power supplied to the motor 11 is controlled by the pulse width modulation system already described (circuit 56 of FIG. 4). This is similar to a feedback control system in that the filter 57 receives a signal P1 that is dependent upon the difference between the position or output of the potentiometer 25 relative to the current sensed by the sensor 29. The greater the difference, the greater the duty ratio that is output to the system. FIG. 6 shows the condition wherein the FET 31 is switched on and under this condition current flows from the battery through the diode 34 to the exciter circuit 13. This current then flows through the diode 41 to the armature circuit 12 so as to provide the electric power to operate the motor 11. As previously noted, this is done by outputting the signal G1 from the FET drive circuit 64 to the gate of the FET 31.

Figure 4:
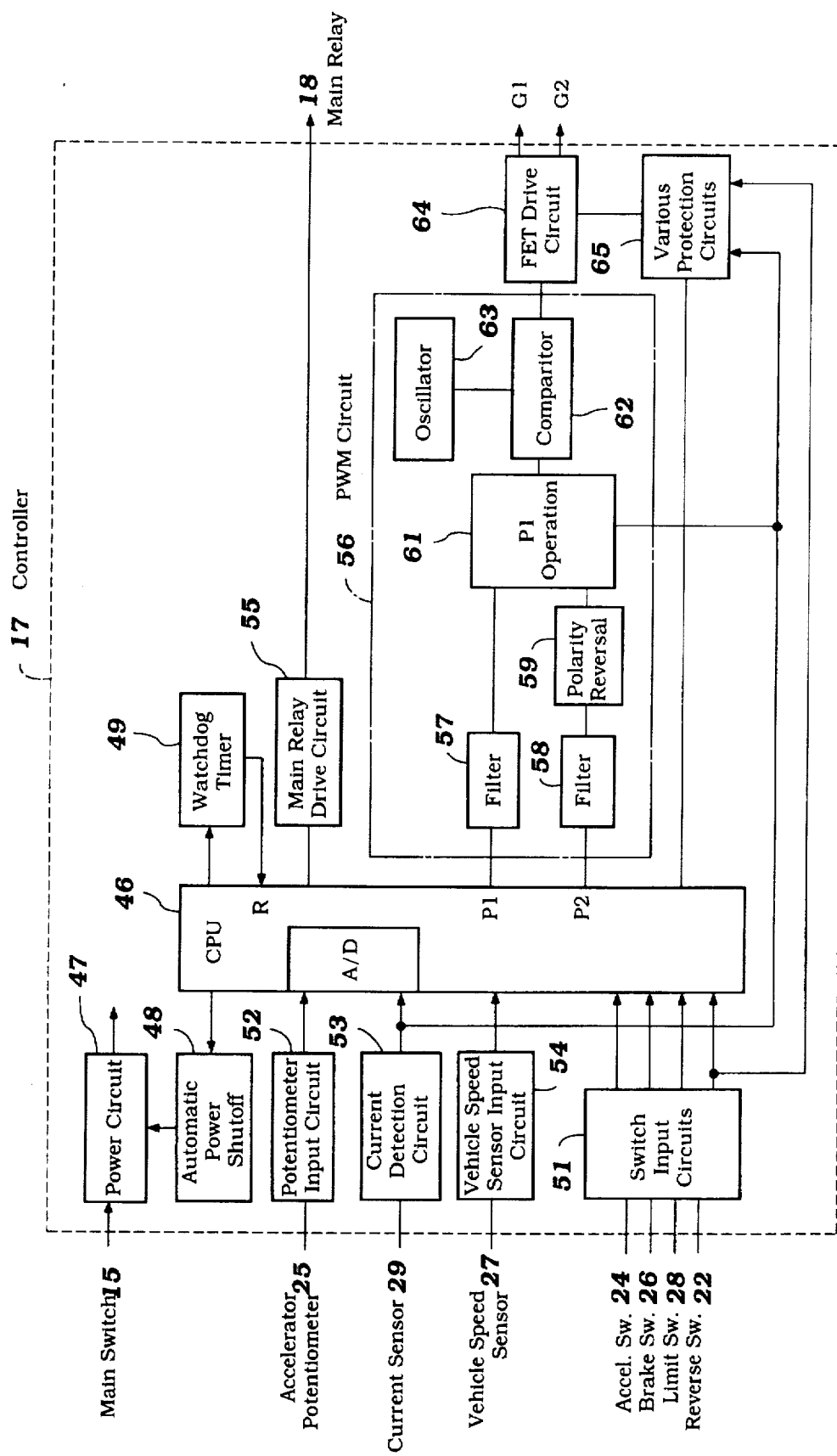
FIG. 4 is a partially schematic view showing the components of the controller and its interrelationship to the other components of the system.

As long as the PWM pulse G1 is at a high level, the FET 31 is in the on state and the current flows in the path indicated by the arrows in FIG. 4. This effects operation of the motor 11 in the forward drive direction. The slope of this curve depends upon the set time constant and is indicated in FIG. 1 at the left-hand side.

Figure 7:
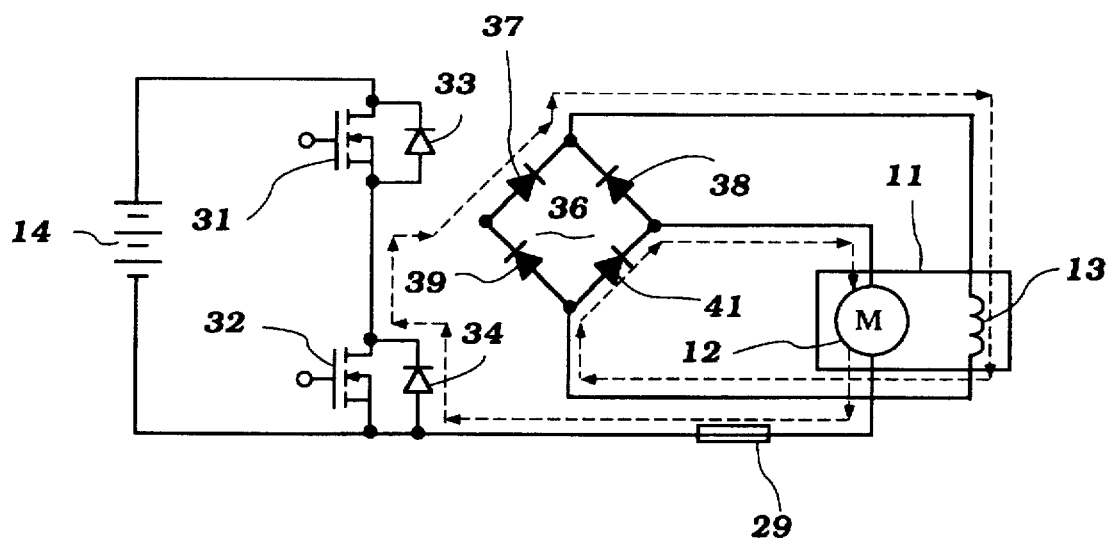
FIG. 7 is a further schematic view, in part similar to FIG. 6, and shows the control mode 2 of FIG. 5.

Assuming the operator does not move the position of the accelerator pedal, once the vehicle is operating at the called-for speed, the FET 31 will receive a low pulse width G1 and it will go to its off state as shown in FIG. 7. Under this condition, current flows through a path as aforedescribed and the electrical energy that has been stored in the exciter coil 14 will be dissipated by heating of the various resistances in this flow path. The current flow gradually decreases in time as shown in FIG. 5 in the portion indicated by the numeral 2.

As the operator continues to depress the accelerator pedal at varying amounts in response to his demand, the aforedescribed condition will repeat. The greater the accelerator pedal opening, the longer the duty ratio of the pulse G1 and the on state of the FET 31 is longer. As a result, the current flowing through the exciter coil 13 and armature coil 14 of the motor will extend and the driving force will increase. However, as the accelerator pedal opening decreases, the on time of the FET 31 will become shorter and the decrease of the current flow will again dissipate as shown in this figure.

As has been noted, there is provided an arrangement which will ensure that the maximum speed of the powered vehicle cannot exceed a preset speed. Thus, if the speed of the vehicle as sensed by the vehicle speed sensor 27 is above this preset speed, then the CPU 46 causes the duty ratio of the pulse width modulation circuit 56 and specifically the pulse P1 to be set by the difference between the current vehicle speed and the maximum permitted vehicle speed. This causes the current flowing through the DC motor 11 to decrease and also the vehicle speed to decrease. If, however, this still does not bring the vehicle speed below the preset vehicle speed, then the braking mode is initiated. This braking mode is also initiated in the circumstance when the operator removes his foot from the accelerator pedal. This braking mode will now be described by reference to the portion of FIG. 5 indicated where the accelerator switch 24 is determined to be in its off condition. As noted previously, reference should also be made to FIGS. 8 and 9. It is to be understood that in addition to having the braking initiated by having an accelerator switch which determines when the accelerator pedal is depressed or not, the same result can be achieved by reading the output of the potentiometer 25 and having the output be set to zero when the accelerator pedal is not depressed.

In order to initiate the braking mode, there must be a current existent in the exciter coil 13. Thus, there is a possibility that if the operator has gradually reduced the opening of the throttle pedal to the zero condition, as shown in FIG. 5, the exciter current would have been rapidly decreased and thus regenerative braking could not be performed.

Therefore, in accordance with a feature of the invention, the system is operative so as to apply an exciter current on the motor exciter coil 13 when the accelerator switch has gone to its off state for a specified period of time. In order to accomplish this, the CPU 46 outputs a signal G1 to turn the FET 31 on and the output signal G2 is discontinued so that the FET 32 is off. The FET 32 is then turned on after this brief time period. This is indicated in FIG. 5.

Figure 8:
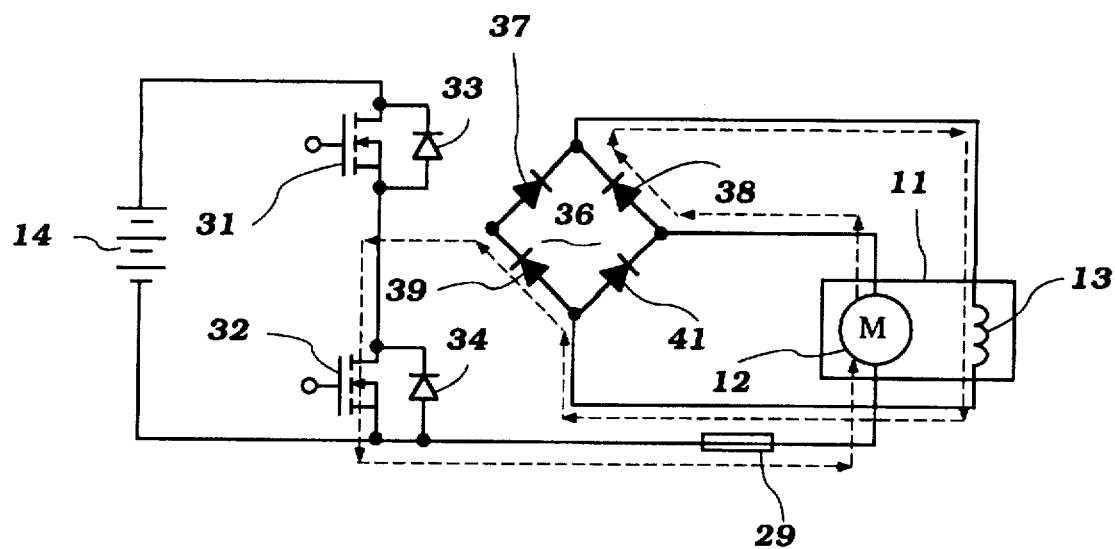
FIG. 8 is a schematic view, in part similar to FIGS. 6 and 7, and shows the control mode 3 which comprises a portion of the braking mode.

Hence, once the FET 32 is switched on, the condition shown in FIG. 8 will occur. Under this circumstance, the rotation of the motor armature causes a current to be generated that flows from the armature winding 12 through the diode 38 through the exciter winding 13 and then through the diode 39 and FET 32 back to the other side of the armature winding. When this occurs, the current output will gradually increase as shown by the portion 3 of FIG. 5.

Figure 9:
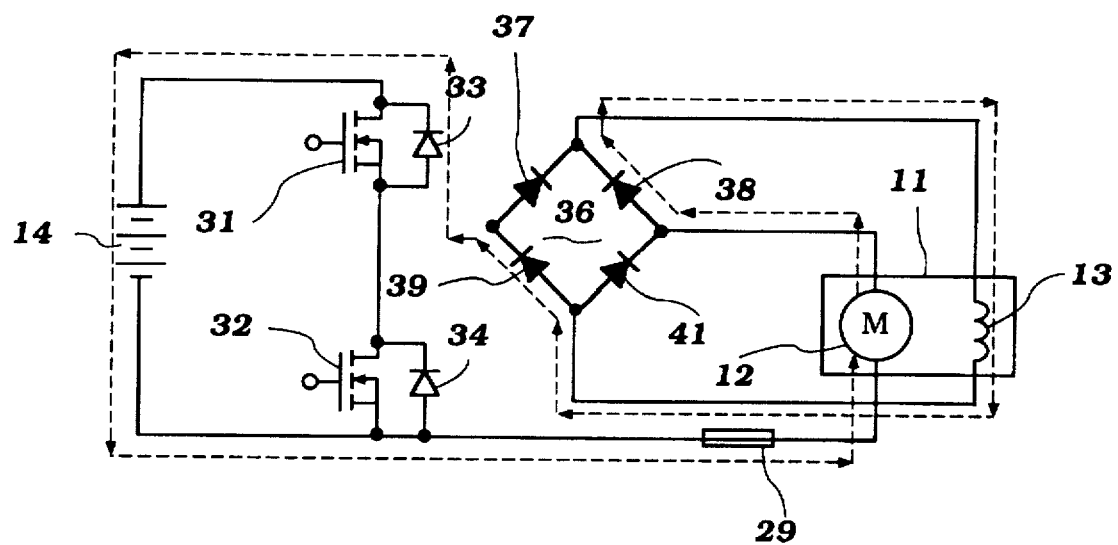
FIG. 9 is a schematic view, in part similar to FIGS. 6-8, and shows the control mode 4 of the braking mode.

Thus, the level of the pulse width modulator output G2 is decreased and the FET 32 is set to the off condition as shown in FIG. 9. This causes an actual charging to occur in the battery through the path shown in FIG. 9 wherein the current can flow to the battery through the diode 33. During this time period, the current flow gradually decreases as shown by the portion 4 of FIG. 5. This operation continues every time a pulse G2 is transmitted and the vehicle speed decreases gradually. At the time when the vehicle speed decreases to a value which is zero, then the pulse width values P1 and P2 are set at zero and the main relay 18 is turned off as aforedescribed.

The aforenoted operation assumes that the brake pedal has not been activated and the operator is merely permitting the vehicle to be braked by releasing the accelerator pedal. However, if the brake pedal switch 26 is closed, then the CPU 46 outputs a signal to increase the pulse width P2 in proportion to the duty ratio called for by the deceleration command and a specific value of braking amount which can be preset. Thus, a brake force greater than that merely produced by the release of the accelerator is possible.

If the brake switch is not set on, i.e., switch 26 off, and the vehicle is on an incline and begins to run downhill, then the CPU 46 will determine that a deceleration command is given. That is, the accelerator switch is off but the vehicle has a velocity. Therefore, the main relay 18 will be switched on by the main relay drive circuit 55 and a deceleration program will begin by setting the FET 32 off and the FET 31 on for a brief period of time so as to establish a current in the exciter coil 13. After that, the FET 32 is turned on and the braking routine shown at the right-hand side of FIG. 5 and in FIGS. 8 and 9 will be repeated until the vehicle is stopped. During this time, if the operator applies a force to the brake pedal to close the brake switch 26, then this signal will be added to the P2 signal and a greater braking force will be applied.

Also, if during coasting it occurs that the vehicle speed exceeds the maximum vehicle speed, then the same type of braking operation will be achieved by turning the FET 32 off momentarily while turning the FET 31 on momentarily to again reestablish a current flow in the exciter coil 13. The braking mode is then operated so as to again return the vehicle speed to a speed not greater than the maximum permitted speed.

Thus, it should be apparent from the foregoing description that the described embodiment of the invention provides high startup torques through the use of a DC series motor but also excellent operation because of automatic braking when the accelerator pedal is released. In addition, electric power consumption is reduced and recharging intervals can be extended since the battery is charged during a portion of the regenerative braking operation.

Of course, the foregoing description is that of a preferred embodiment of the invention and various changes and modifications may be made without departing from the spirit and scope of the invention, as defined by the appended claims.

What is claimed is:

1. An electric motor control for an electric motor driven vehicle, said motor comprising an armature and an exciter winding, a battery, a first parallel circuit comprising a first switch and a first diode connected to a first terminal of said battery, a second parallel circuit comprising a second switch and a second diode connected to a second terminal of said battery so that said parallel circuits are in series circuit with each other, and a motor control circuit including a diode bridge having one junction thereof connected to the juncture of said first and said second parallel circuits, the opposite juncture of said diode bridge being connected to one terminal of said armature winding, the other terminal of said armature winding being connected to the second terminal of said battery, an accelerator and brake control and means for selectively operating said switches to energize said armature winding from said diode bridge junctures for providing electrical power for operating said vehicle when said accelerator and brake control calls for acceleration and for selectively operating said switches so that said motor functions as a generator for charging said battery for providing regenerative braking of said vehicle when said accelerator and brake control calls for braking of the vehicle.

2. An electric motor control as set forth in claim 1, wherein the accelerator and brake control is responsive to release of the accelerator control for providing a braking force when the accelerator and brake control is released.

3. An electric motor control as set forth in claim 2, wherein the first switch is actuated for a brief period of time when the accelerator and brake control is released if current is not flowing through the armature at the time of release for establishing a current flow before the second switch is turned on.

4. An electric motor control as set forth in claim 2, wherein the accelerator and brake control includes a brake actuator and the second switch is turned on in response to operation of the brake actuator.

5. An electric motor control as set forth in claim 4, wherein the braking force is provided as a sum of the braking force caused by the release of the accelerator control and that called for by the operation of the brake actuator.

6. An electric motor control as set forth in claim 1, further including means for measuring the vehicle speed and means for operating said switches when the vehicle speed exceeds a predetermined speed for retarding the speed of the vehicle.

7. An electric motor control as set forth in claim 1, further including a main switch and means for opening said main switch and both of the switches when the accelerator control is released and the vehicle speed is zero.

8. An electric motor control as set forth in claim 7, further including means for turning on the second switch if the vehicle begins to move before the accelerator control is operated.

9. An electric motor control as set forth in claim 1, further including an exciter coil for the electric motor, the exciter coil being in circuit with a respective one of two selected junctions of the diode bridge for effecting rotation of the motor in a selected direction.

10. An electric motor control as set forth in claim 1, further including a controller for comparing the operator-desired power output of the motor and the current flow through the motor and providing a duty cycle for actuating the switches to achieve the desired power level.

11. An electric motor control as set forth in claim 10 wherein the accelerator and brake control includes an accelerator control for the vehicle and wherein the means for operating the switches for energizing the armature winding is responsive to the operation of the accelerator control.

12. An electric motor control as set forth in claim 11, wherein the means for operating the switches for braking operation is responsive to release of the accelerator control for providing a braking force when the accelerator control is released.

13. An electric motor control as set forth in claim 12, wherein the first switch is actuated for a brief period of time when the accelerator control is released if current is not flowing through the armature for establishing a current flow before the second switch is turned on.

14. An electric motor control as set forth in claim 11, wherein the switches are FET's and the controller is in circuit with their gates for effecting their switching.

15. An electric motor control as set forth in claim 14, wherein the accelerator and brake control includes an accelerator control for the vehicle and wherein the means for operating the switches is responsive to the operation of the accelerator control.

16. An electric motor control as set forth in claim 15, wherein the means for operating switches to effect regeneration braking is responsive to release of the accelerator control for providing a braking force when the accelerator control is released.

17. An electric motor control as set forth in claim 16, wherein the first switch is actuated for a brief period of time when the accelerator control is released if current is not flowing through the armature at the time of release for establishing a current flow before the second switch is turned on.

18. An electric motor control as set forth in claim 17, wherein the accelerator and brake control further includes a brake actuator and the second switch is closed in response to operation of the brake actuator.

19. An electric motor control as set forth in claim 18, wherein the braking force is provided as a sum of the braking force caused by the release of the accelerator control and that called for by the operation of the brake actuator.

20. An electric motor control as set forth in claim 14, further including means for measuring the vehicle speed and means for closing the second switch when the vehicle speed exceeds a predetermined speed for retarding the speed of the vehicle.

21. An electric motor control as set forth in claim 16, further including a main switch and means for opening said main switch and both of the switches when the accelerator control is released and the vehicle speed is zero.

22. An electric motor control as set forth in claim 21, further including means for closing the second switch if the vehicle begins to move before the accelerator control is operated.

* * * * *